US010938200B2

(12) United States Patent
Srivastava et al.

(10) Patent No.: US 10,938,200 B2
(45) **Date of Patent: *Mar. 2, 2021**

(54) BACK POWER PROTECTION CIRCUIT

(71) Applicant: INTEL CORPORATION, Santa Clara, CA (US)

(72) Inventors: Amit Kumar Srivastava, Penang (MY); Karthik Ns, Bangalore (IN); Raghavendra Devappa Sharma, Penang (MY); Dharmaray Nedalgi, Bangalore (IN); Prasad Bhilawadi, Rabkavi (IN)

(73) Assignee: Intel Corporation, Santa Clara, CA (US)

(*) Notice: Subject to any disclaimer, the term of this patent is extended or adjusted under 35 U.S.C. 154(b) by 316 days.

This patent is subject to a terminal disclaimer.

(21) Appl. No.: 15/443,161

(22) Filed: Feb. 27, 2017

(65) Prior Publication Data

US 2017/0170646 A1 Jun. 15, 2017

Related U.S. Application Data

(63) Continuation of application No. PCT/US2015/043835, filed on Aug. 5, 2015, which is (Continued)

(51) Int. Cl.
*G06K 19/00* (2006.01)
*H02H 3/18* (2006.01)

(Continued)

(52) U.S. Cl.
CPC ................ *H02H 3/18* (2013.01); *G06F 1/26* (2013.01); *G06F 1/3212* (2013.01); *H04B 1/38* (2013.01); *H04L 25/0272* (2013.01)

(58) Field of Classification Search
CPC .......... H02H 3/18; G06F 1/26; G06F 1/3212; H04B 1/38; H04L 25/0272

(Continued)

(56) References Cited

U.S. PATENT DOCUMENTS 9,601,916 B2 * 3/2017 Srivastava .............. H02H 3/18
2003/0142707 A1 7/2003 Baumgartner (Continued)

FOREIGN PATENT DOCUMENTS

JP 10269780 9/1988
JP 2000500257 1/2000

(Continued)

OTHER PUBLICATIONS

Restriction Requirement dated Aug. 26, 2015 for U.S. Appl. No. 14/483,649.

(Continued)

*Primary Examiner* — Matthew Mikels
(74) *Attorney, Agent, or Firm* — Green, Howard & Mughal LLP

(57) ABSTRACT

Described is an apparatus which comprises: one or more signal lines; a transceiver coupled to the one or more signal lines; and a bias generation circuit to provide one or more bias voltages for the transceiver to tri-state the transceiver according to signal attributes of the one or more signal lines.

25 Claims, 13 Drawing Sheets

100

Host 101
Platform 102
Device 103
USB Transceiver AFE (Dual Role Device) 104
USBDP
USBDM
VBUS
ID
GND
s1
s2
USB Transceiver (Dual Role Device) or Charger or Dock 109
ESD Circuit 105
GND
ID
VBUS
USBDM_BC
USBDP_BC
BC1.2
PMIC 106
107
Supply
Schottky Diode 108

Related U.S. Application Data a continuation of application No. 14/483,649, filed on Sep. 11, 2014, now Pat. No. 9,601,916.

(51) Int. Cl.

| | |
|---|---|
| ***G06F 1/26*** | (2006.01) |
| ***G06F 1/3212*** | (2019.01) |
| ***H04B 1/38*** | (2015.01) |
| ***H04L 25/02*** | (2006.01) |

(58) Field of Classification Search

USPC ................ 235/435, 439, 441, 454, 487, 492

See application file for complete search history.

(56) References Cited

U.S. PATENT DOCUMENTS

| | | | | |
|---|---|---|---|---|
| 2004/0263214 | A1 | 12/2004 | Patterson | |
| 2005/0156038 | A1* | 7/2005 | Wurzburg | G06F 1/266 235/435 |
| 2009/0248930 | A1 | 10/2009 | Garlapati | |
| 2011/0043162 | A1 | 2/2011 | Lee | |
| 2012/0099675 | A1 | 4/2012 | Kitamura | |
| 2013/0094538 | A1 | 4/2013 | Wang | |
| 2015/0003503 | A1* | 1/2015 | Cassata | H02H 9/04 375/219 |

FOREIGN PATENT DOCUMENTS

| | | |
|---|---|---|
| JP | 2008192106 | 8/2008 |
| JP | 2013511787 | 4/2013 |
| WO | 2013101479 | 7/2013 |

OTHER PUBLICATIONS

Final Office Action dated Jan. 13, 2016 for U.S. Appl. No. 14/483,649.

Extended European Search Report for European Patent Application No. 15840839.3, dated May 11, 2018.

Advisory Action dated Mar. 22, 2016 for U.S. Appl. No. 14/483,649.

Office Action dated Sep. 30, 2018 for Chinese Patent Application No. 201580042794.0.

Final Office Action for U.S. Appl. No. 14/483,649, dated Jan. 26, 2016.

Final Office Action dated Aug. 24, 2016, for U.S. Appl. No. 14/483,649.

International Preliminary Report on Patentability for International Patent Application PCT/US2015/043835, dated Mar. 23, 2017.

International Search Report and Written Opinion dated Oct. 27, 2015, for PCT Application No. PCT/US2015/043835.

Non Final Office Action for U.S. Appl. No. 14/483,649, dated Sep. 9, 2015.

Non-Final Office Action dated May 13, 2016, for U.S. Appl. No. 14/483,649.

Notice of Allowance for U.S. Appl. No. 14/483,649, dated Nov. 16, 2016.

Notice of Reasons for Rejection for Japanese Patent Application No. JP2017507803, dated Oct. 10, 2017.

Notice of Allowance for Japanese Patent Application No. 2017-507803, dated Feb. 28, 2018.

Notice of Grant dated Mar. 6, 2019 for Chinese Patent Application No. 201580042794.0.

* cited by examiner

BACK POWER PROTECTION CIRCUIT

CLAIM OF PRIORITY

This application is a 371 of, and claims priority to, PCT Patent Application Serial No. PCT/US2015/043835, filed on Aug. 5, 2015, titled "BACK POWER PROTECTION CIRCUIT: which claims priority to U.S. patent application Ser. No. 14/483,649, filed Sep. 11, 2014, titled "BACK POWER PROTECTION CIRCUIT," both of which are incorporated herein by reference in their entirety for all purposes.

BACKGROUND

Universal Serial Bus (USB) battery charging detection specification defines signaling over differential data lines to detect multiple kinds of charging devices connected to the differential data lines so that a Host (i.e., Host processor and/or platform) can provide charging current to the connected device or the connected device can request to charge its own battery (e.g., request charging current of 1.5 A) from the Host. Charging devices include, for example, a dedicated charger, dock, legacy host, or device (e.g., phone, camera, tablet, etc.), or proprietary charger.

However, charge detection signaling may happen at a very early stage (e.g., before cold boot of the Host) and also during dead battery conditions. During cold boot, Host side transceiver is completely turned off (i.e., no power supplies are available to the Host). In this case, the Host processor starts to observe back power current flowing from the charging device through the differential data lines to the Host transceiver (i.e., the battery of the charging device begins to deplete through a low impedance path from the charging device to the Host transceiver). This back power current may damage the devices of the Host transceiver. Also when the Host side battery is dead and a device (powered or self-powered) is connected to the Host, the Host processor starts to observe back power current flowing from the device through the differential data lines to the Host transceiver (i.e., the battery of the device begins to deplete through a low impedance path from the charging device to the Host transceiver). In such a case, the back power current may damage the devices of the Host.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
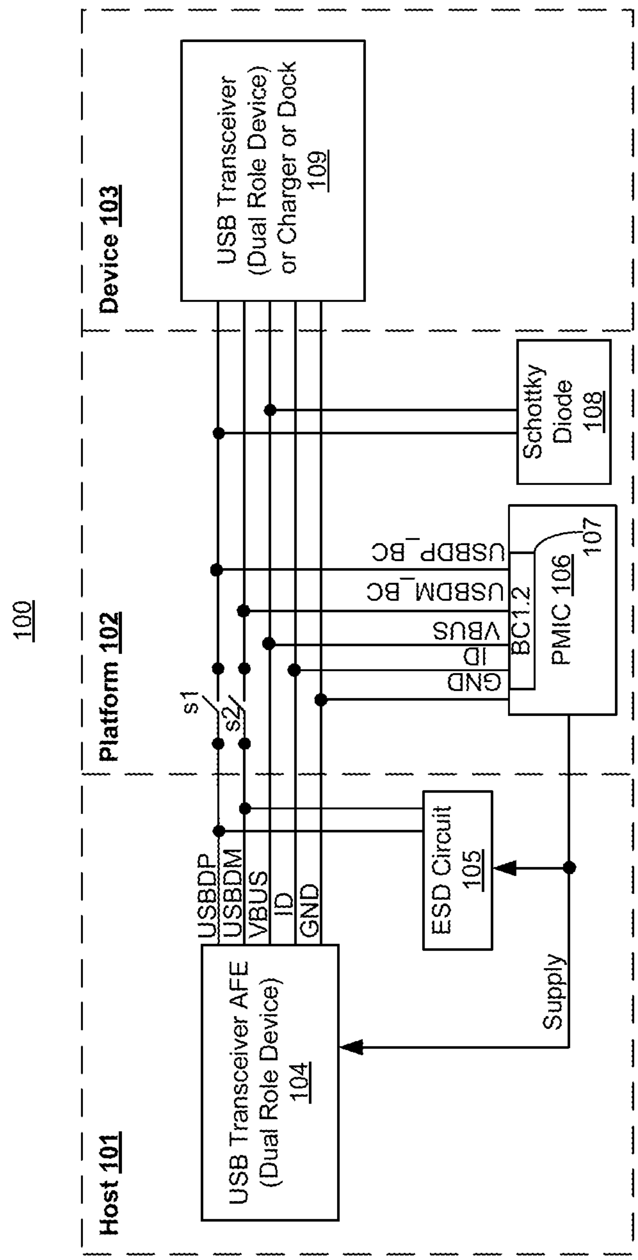
FIG. 1 illustrates a system using a battery charging detection circuit.

FIG. 1 illustrates a system 100 using an off-die Battery Charging (BC) detection circuit. System 100 includes Host 101, Platform 102, and Device 103. System 100 is described with reference to USB battery charging detection specification which defines specifications for differential signal lines USBDP and USBDM, supply line VBUS, device identification (ID) line, and Ground (GND) line. The problems associated with back power current are also applicable to non-USB compliant devices. For example, HDMI (High-Definition Multimedia Interface), and Sim-Card application compliant devices when connected to Host 101 via Platform 102 may exhibit back power current issues.

Host 101 includes a USB Transceiver Analog Front-End (AFE) 104 which is a Dual Role Device (i.e., it can operate at multiple voltages, for example, 1.0V, 1.8V, and 3.3V) and Electro-Static Discharge (ESD) Circuit 105 to protect ESD events on the differential signal lines USBDP and USBDM. Device 103 is a USB Transceiver (e.g., a Dual Role Device), Charger, or Dock 109 which can connect to Host 101 via Platform 102. Platform 102 includes Power Management Integrated Circuit (PMIC) 106 and Schottky Diodes 108. PMIC 106 provides Supply to USB Transceiver AFE 104 and ESD Circuit 105. PMIC 106 includes a BC Detection Circuit (e.g., BC 1.2 specification compliant circuit) to detect via differential signal lines USBDP_BC and USBDM_BC whether Device 103 is connected to Platform 102 for charging.

In the absence of switches s1 and s2 (USBDP_BC and USBDM_BC lines are shorted to USBDP and USBDM lines, respectively), Host 101 starts to receive back power current since the differential signal lines USBDP and USBDM provide much lower impedance path (e.g., less than 10 Ohms) to Host 101 than the charging detection driver path (i.e., path from PMIC 106 to Device 103). This lower impedance path stops the BC detection signaling on the differential signal lines USBDP and USBDM and so the BC detection in Device 103 is not able to detect or drive these differential signal lines. When Host 101 battery is dead or completely turned off during cold boot, back power current may also be observed by Host 101. In some cases, with switches s1 and s2 present, PMIC 106 may not be able to fully isolate the differential lines USBDP and USBDM during charging detection.

When Charging Device 109 is connected to USBDP/USBDM differential lines on Platform 102 and starts driving 3.3V, 1.8V, or 1.0V signaling on those lines while Host 101 and Platform 102 are completely turned off, transistors of USB Transceiver AFE 103 will see Electrical Overstress (EOS) conditions when charging detection signaling is 3.3V/1.8V. Transistors of USB Transceiver AFE 103 will see EOS conditions because devices in USB Transceiver AFE 103 are 1.8V/1.0V reliability compliant devices. Since Host 101 and Platform 102 are completely turned off, internal bias generation circuits of Host 101 will not be able to provide sufficient biases for 1.8V/1.0V reliability compliant transistors in USB Transceiver AFE 104, which are now receiving 3.3V signaling on USBDP/USBDM differential lines.

In the absence of switches s1 and s2, back power current rushes on differential lines USBDP and USBDM to USB Transceiver AFE 104 and can cause metal and transistor reliability issues. Accordingly, in some embodiments, switches s1 and s2 are provided on differential lines USBDP/USBDM to cut off USB Transceiver AFE 104 from Charging Device 109 when power supplies to USB Transceiver AFE 104 are off.

Similar issues are also observed in NFC (i.e., Near Field Communication) devices, which are contactless devices operating within distances such as 1 cm to 10 cms. NFC devices normally use RF (Radio Frequency) protocols, most of them comply with ISO/IEC 14443A (Identification cards-Contactless integrated circuit cards as defined by Joint Technical Committee of the International Organization for Standardization (ISO) and the International Electro Technical Commission (IEC)), ISO/IEC 14443B, ISO 15693, and ISO 18092 in general. The main power supply for most of the NFC devices ranges between 2.55V to 5.5V and the IO voltages ranges from 1.5V to 3.5V to support both class-B and class-C voltages for the UICC (Universal Integrated Circuit Card) and secure elements.

The products supporting NFC features may also operate in battery off mode also known as Power-By-Field mode. This is a special mode in card emulation. A typical use case of this mode is a user who presents a mobile phone to a reader to enter a train and if the battery is off, then the NFC device harvests the energy from the reader's field. This harvested energy powers up the device and allows the transaction for the user to complete. In this case, the UICC element (e.g., SIM card) is supplied by the power from the reader's field while the interface on the modem is off. Back current flows to the modem and may harm the interface.

Figure 2:
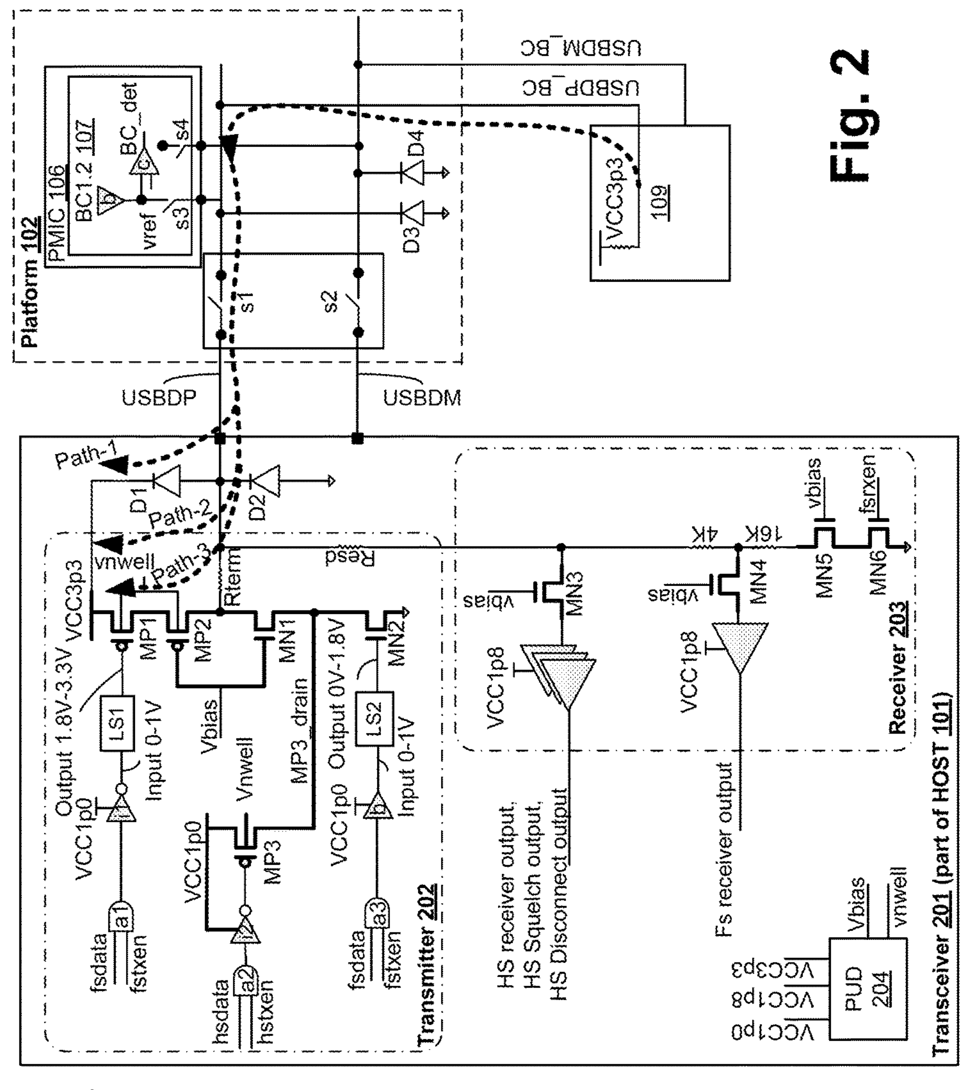
FIG. 2 illustrates a detailed portion of the system of FIG. 1 with multiple paths of back current flow.

FIG. 2 illustrates a detailed portion 200 of System 100 of FIG. 1 with multiple paths of back current flow. It is pointed out that those elements of FIG. 2 having the same reference numbers (or names) as the elements of any other figure can operate or function in any manner similar to that described, but are not limited to such.

The detailed portion 200 comprises Transceiver 201 having Transmitter 202, Receiver 203, and Power-up Detector (PUD) 204; Platform 102, and Charging Device 109. Transmitter 202 comprises p-type transistors MP1, MP2, and MP3, n-type transistors MN1 and MN2, inverters i1 and i2, buffer b, logic AND gates a1, a2, and a3, Level-Shifters (LS) LS1 and LS2, termination resistors Rterm, ESD diodes D1 and D2 coupled together as shown. So as not to obscure the description, a simplified architecture of Transceiver 201 is shown.

Here, Transmitter 202 provides two types of signaling-1.8V and 3.3V signaling on differential signaling lines USBDP and USBDM. So as not to obscure the description, Transceiver 201 for USBDP signal line is shown. The same description applies to USBDM signal line. Here, unless otherwise specified, VCC1p0 refers to 1.0V Vcc supply, VCC3p3 refers to 3.3V Vcc supply, and VCC1p8 refers to 1.8V Vcc supply. LS1 converts signal swing of Input, swinging from 0V to 1V, to Output swing of 1.8V to 3.3V. LS2 converts signal swing of Input, swinging from 0V to 1V, to Output swing of 0V to 1.8V.

When 3.3V signaling is enabled, driver comprising p-type transistors MP1, MP2, MN1 and n-type transistor MN2 are enabled to drive on the USBDP line. Gate terminals of MP1 and MN1 are biased by Vbias. Gate terminal of MP1 is driven by the output (which swings from 1.8V to 3.3V) of LS1 which is a version of fsdata (Data) when fstxen (enable signal) enables AND gate a1. Gate terminal of MN2 is driven by the output (which swings from 0V to 1.8V) of LS2 which is a version of fsdata (Data) when fstxen (enable signal) enables AND gate a3. The bulk (i.e., well or substrate) of MP1 is coupled to Vnwell (i.e., p-type transistor substrate voltage).

When 1.8V signaling is enabled, MP3, MN2, and MN1 are enabled to drive on the UBSDP line. In this case, fstxen causes MP1 to turn off. MP3 is enabled to drive hsdata (High-Speed Data) because hstxen (High-Speed data enable signal) enables AND gate a2 to allow hsdata to pass through to the gate of MP3. The bulk (i.e., well or substrate) of MP3 is coupled to Vnwell (MP3 bulk voltage).

Receiver 203 comprises n-type transistors MN3, MN4, MN5, and MN6; buffers, and resistors (in this example, 4 KOhms and 16 KOhms) coupled together as shown. BC 1.2 107 of PMIC 106 in Platform 102 comprises buffers and a comparator 'c' to provide an output BC_det indicating detection of Charging Device 109 to be charged. Diodes D3 and D4 are used to provide ESD protection on the USBDP and USBDM lines, respectively.

During battery charging detection, switches s1 and s2 are turned off and switches s3 and s4 are turned on. BC 1.2 107 then starts to drive signals over the USBDP line through driver 'b' and detects signals on the USBDM line through the comparator 'c'. Similarly, a buffer (not shown) starts driving signals over the USBDM line and detects signals through the comparator c connected to the USBDP line to identify the type of charging devices.

FIG. 2 shows multiple back power current paths. In Path-1, back power current path starts from Charging Device 109 and traverses through the USBDP line to the VCC3p3 node via ESD diode D1. Current through Path-1 flows when voltage on the USBDP line is more than the cut-off voltage of diode D1. In Path-2, back power current path starts from Charging Device 109 and traverses through the USBDP line to the VCC3p3 node via the substrate (i.e., Vnwell node) of MP1 and MP2 transistors. Current through Path-2 flows when all power supplies in Transceiver 201 are off (i.e., VCC3p3, VCC1p8, and VCC1p0 are 0V). In Path-3, back power current path starts from Charging Device 109 and traverses through the USBDP line to the VCC3p3 node via junction diodes of MP1 and MP2 transistors. Current through Path-3 flows when voltage on the USBDP line is more than the cut-off voltage of junction diodes of MP1 and MP2 transistors. In this example, transistors MP1, MP2, MN1, MN3, MN4, and MN5 are exposed to EOS conditions (i.e., devices designed to reliably operate at 1.8V are exposed to 3.3V of overstress).

In some embodiments, EOS conditions are mitigated by providing switches s1 and s2 on the USBDP and UBSDM lines, respectively, such that the switches are operable to decouple the USBDP_BC line from the USBDP line and to decouple the USBDM_BC line from the USBDM line during back current flow. In some embodiments, these switches are turned off (i.e., the switches are opened) when power supplies in Transceiver 201 are off (i.e., VCC3p3, VCC1p8, and VCC1p0 are 0V). However, these discrete switches s1 and s2 and associated logic add to the overall cost of system 100.

For example, switches s1 and s2 alone may add nearly 10-30 cents per platform cost, which is significant. Operating the switches s1 and s2 in a timely manner requires extra logic and time. For example, PMIC 106 may have a detection time of nearly 500 ms (i.e., time to detect back current flow). During that time, switches s1 and s2 will be transparent causing back power current to flow to Transceiver 201. The presence of switches s1 and s2 increases overall power consumption of Transceiver 201.

For example, when Transceiver 201 operates in High-speed (HS) mode, the driver of Transmitter 202 uses pre-emphasis technique which may result in additional power consumption (e.g., 4 mW extra power) to drive each switch. Operating the switches s1 and s2 adds further complexity to PMIC 106 and BC 1.2 107 designs including the cost of extra pins. Operating the switches s1 and s2 also complicates board level routings that connect PMIC 107 to differential lines USBDP and UBSDM.

To solve the above problems, in some embodiments, Transmitter 202 is tri-stated to provide high impedance when power to Transmitter 202 is off and/or under certain power supply conditions. In some embodiments, an on-die back power protection circuit is provided that uses low voltage (e.g., 1.0V and 1.8V) reliability compliant devices to protect transistors of Transceiver 201 during conditions of back current flow. In some embodiments, back power protection circuit tri-states Transmitter 202 by generating internal biases to protect low voltage devices (e.g., 1V and 1.8V operating devices) in Transceiver 201 from higher voltage (e.g., 3.3V) connected to the differential lines USBDP/USBDM. In some embodiments, back power protection circuit tri-states Transmitter 202 by generating internal biases to protect itself when handling higher voltage domain conditions (e.g., 3.3V conditions) while using low voltage devices (e.g., 1.8V and/or 1.0V devices).

While the embodiments are described with reference to the USB battery charging detection specification, which defines specifications for differential signal lines USBDP and USBDM, supply line VBUS, ID line, and GND line, the embodiments are also applicable to non-USB compliant devices. For example, embodiments are applicable to HDMI, Modem Interface Connected (MIC) to UICC element in NFC application or, Sim Card, etc., compliant devices to protect them from back power current issues.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano-tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 3:
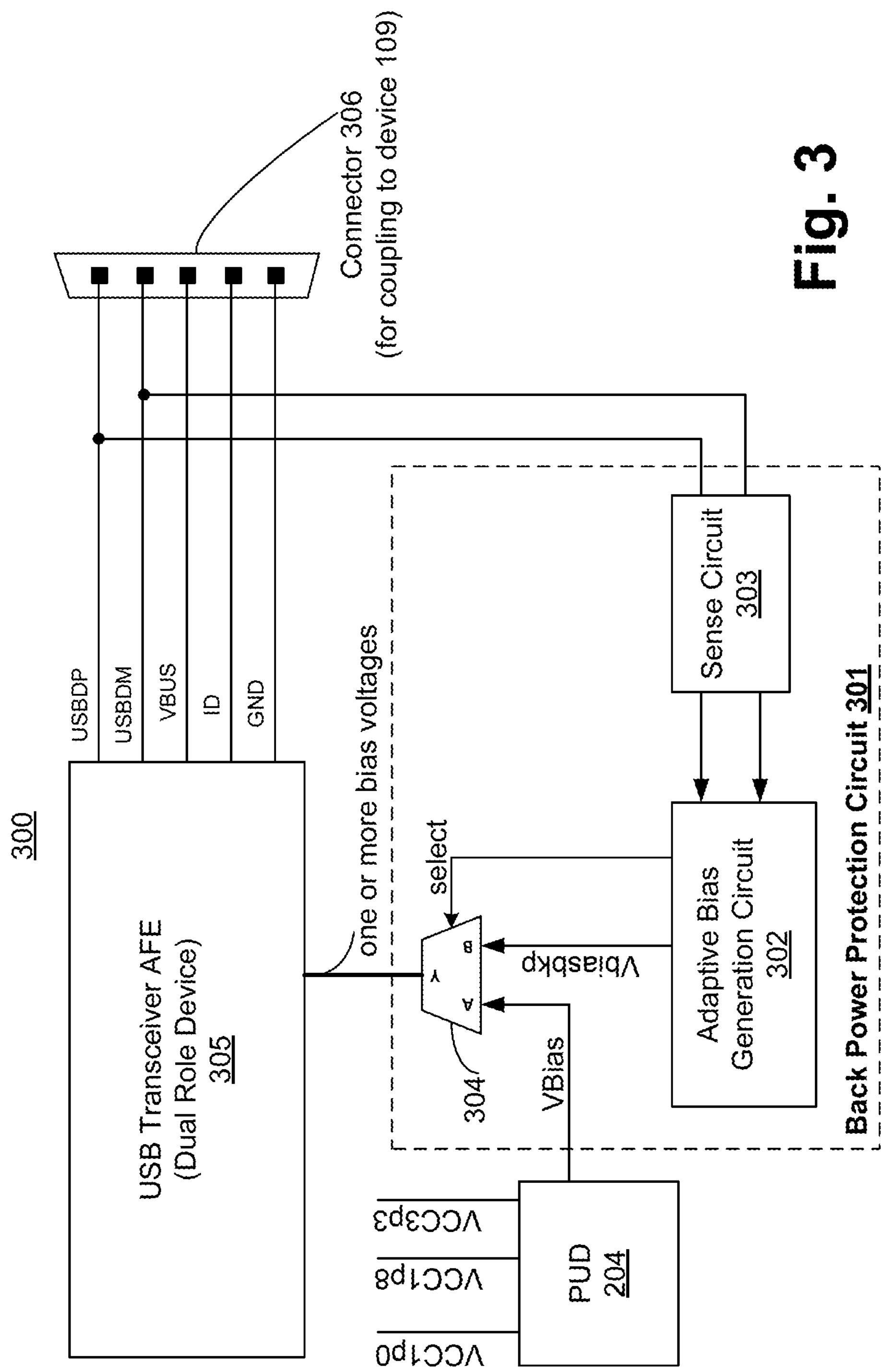
FIG. 3 illustrates a high level architecture of a back power protection circuit, according to some embodiments of the disclosure.

FIG. 3 illustrates a high level architecture 300 of a back power protection circuit, according to some embodiments of the disclosure. It is pointed out that those elements of FIG. 3 having the same reference numbers (or names) as the elements of any other figure can operate or function in any manner similar to that described, but are not limited to such.

In some embodiments, architecture 300 comprises Back Power Protection Circuit 301, USB Transceiver AFE 305 (which is a modified version of Transceiver 201), Connector 306, and PUD 204. In some embodiments, Back Power Protection Circuit 301 comprises Adaptive Bias Generation Circuit 302, Sense Circuit 303, and Selection logic 304. In some embodiments, Sense Circuit 303 detects power supply off conditions by monitoring the differential lines USBDP and USBDM. In some embodiments, output of Sense Circuit 303 provides detection results to Adaptive Bias Generation Circuit 302 so that Adaptive Bias Generation Circuit 302 can determine whether to provide the bias voltage(s) generated by PUD 204 to USB Transceiver AFE 305 or to provide the bias voltage(s) generated by Adaptive Bias Generation Circuit 302 for USB Transceiver AFE 305.

In some embodiments, Adaptive Bias Generation Circuit 302 provides one or more bias voltages (here lumped as Vbiasbkp for simplicity purposes) to Selection logic 304. When one or more of the bias voltages Vbiasbkp are selected by Selection logic 304 via select signal, these bias voltages protect devices of USB Transceiver AFE 305. For example, the bias voltages cause the Vgs of the transistors to be below the reliability threshold, and/or tri-state the transmitter in USB Transceiver AFE 305. In some embodiments, one or more of the bias voltages Vbiasbkp also protect devices inside Adaptive Bias Generation Circuit 302. In some embodiments, one or more of the bias voltages Vbiasbkp when selected, tri-state the high-speed driver of USB Transceiver AFE 305 to protect it from the back current flow provided by Charging Device 109 coupled to Connector 306.

In some embodiments, during normal functional mode when PUD 204 detects the presence of all power supplies (i.e., VCC1p0, VCC1p8, and VCC3p3 are at their normal voltage levels), Adaptive Bias Generation Circuit 302 selects the one or more bias voltages (here lumped as VBias for simplicity purposes) from PUD 204 for USB Transceiver AFE 305. In some embodiments, Back Power Protection Circuit 301 may also comprise a modified ESD structure coupled to the differential lines USBDP and USBDM to avoid ESD diode to be turned on during actual ESD events.

Figure 4B:
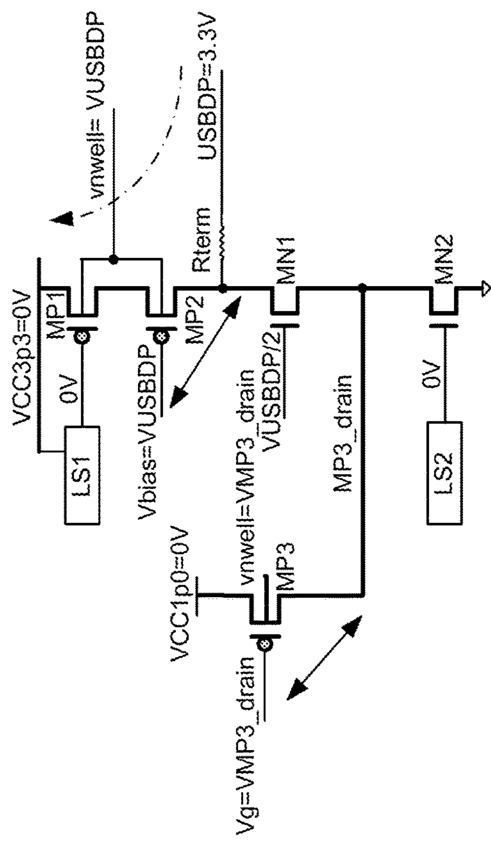
FIG. 4B illustrates a multi-voltage signaling transmitter with transistors biased to protect themselves in the absence of power supplies, according to some embodiments of the disclosure.
Figure 4A:
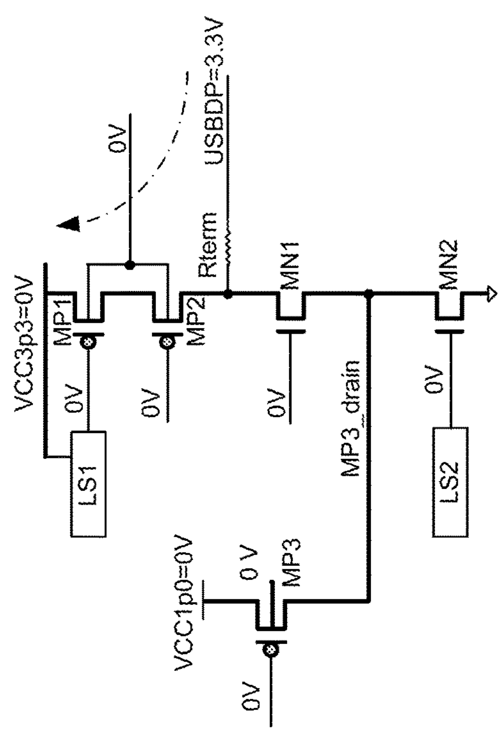
FIG. 4 illustrates a multi-voltage signaling transmitter with possible stressed devices in the absence of power supplies.
FIG. 4C illustrates the multi-voltage signaling transmitter with transistors biased to protect themselves in the presence of a high power supply, according to some embodiments of the disclosure.

FIG. 4 illustrates a multi-voltage signaling transmitter 400 (e.g., Transmitter 202) with possible stressed devices in the absence of power supplies and in the absence of Back Power Protection Circuit 301. It is pointed out that those elements of FIG. 4 having the same reference numbers (or names) as the elements of any other figure can operate or function in any manner similar to that described, but are not limited to such.

Transmitter 400 shows an operating condition when power supplies VCC3p3, VCC1p8, and VCC1p0 are completely off. In such a case, if any charger circuitry (e.g., Charging Device 109 operating at higher voltage like 3.3V) is connected to the USBDP line then transistors MN1, MP2, and MP1 will see EOS conditions and back power current will flow as shown by the dotted path.

FIG. 4B illustrates a multi-voltage signaling transmitter 420 (e.g., transmitter of USB Transceiver AFE 305) with transistors biased to protect themselves in the absence of power supplies, according to some embodiments of the disclosure. It is pointed out that those elements of FIG. 4B having the same reference numbers (or names) as the elements of any other figure can operate or function in any manner similar to that described, but are not limited to such.

In some embodiments, the transistors in transmitter 420 are biased by Adaptive Bias Generation Circuit 302 to protect itself from back current flow when Charging Device 109 is connected to the USBDP line via Connector 306. One or more of the bias voltages (here lumped as Vbiasbkp for simplicity purposes) include VMP3_drain (i.e., drain voltage of MP3), VUSBDP/2, VMP3_drain, and VUSBDP, where VUSBDP is the voltage on the USBDP line. In some embodiments, the internal bias voltages are provided for gate terminals of MP1, MP2, MP3, and MN1, and substrate/well voltages for MP1, MP2, and MP3 to protect these devices from back power by causing these devices to turn off.

In some embodiments, during back power protection conditions, Adaptive Bias Generation Circuit 302 generates voltage for the gate terminal of MP2 device, where the gate voltage follows VUSBDP voltage such that Vg=Vnwell=VUSBDP for MP2 (where Vg is gate voltage and Vb is bulk voltage). By setting Vg=Vnwell=VUSBDP, Vgs of MP2 is 0V and provides high impedance path during back power condition.

In some embodiments, Adaptive Bias Generation Circuit 302 generates gate voltage (Vg) of MN1 to be half of the voltage on the USBDP line (i.e., VUSBDP/2) to protect MN1 from EOS condition. In some embodiments, the same bias voltage is provided to Receiver 203 of USB Transceiver AFE 305 circuit for EOS protection (i.e., to the gate terminals of MN3, MN4, and MN5). In some embodiments, Adaptive Bias Generation Circuit 302 generates the gate voltage (Vg) for MP3 device which follows the drain voltage of MP3 (i.e., Vg=Vnwell=VMP3_drain), where MP3_drain is the drain terminal of MP3. In this condition, Vgs of MP3 transistor is 0V to provide high impedance. By providing the bias voltages as such, Adaptive Bias Generation Circuit 302 ensures that during all operating conditions, the low voltage devices (e.g., 1.8V devices) will not see more than the low voltage operating condition (i.e., 1.8V operating condition). In some embodiments, LS1 and LS2 are deterministic level-shifters that provide 0V output when the power supply to the level-shifters is 0V. In this case, the gate terminals of MP1 and MN2 are biased to 0V.

Figure 4C:
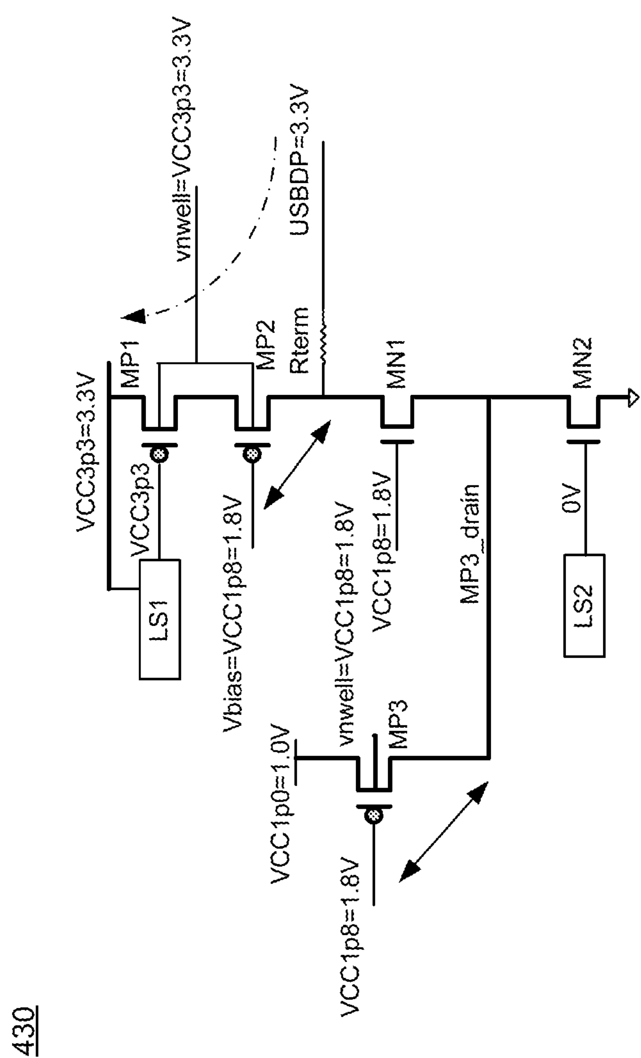

FIG. 4C illustrates the multi-voltage signaling transmitter 430 with transistors biased to protect themselves in the presence of a high power supply, according to some embodiments of the disclosure. It is pointed out that those elements of FIG. 4C having the same reference numbers (or names) as the elements of any other figure can operate or function in any manner similar to that described, but are not limited to such.

In some embodiments, when all power supplies are up, Adaptive Bias Generation Circuit 302 causes Selection logic 304 to select bias voltages generated from PUD 204 as shown for node voltages of transmitter 430. For example, when all power supplies are up, PUD 204 provides: low voltage (e.g., 1.8V) to gate terminal of MP2, high voltage (e.g., 3.3V) to bulk/substrate terminal Vnwell of MP1 and MP2, low voltage (e.g., 1.8V) to gate terminal of MN1, and low voltage (e.g., 1.8V) to gate terminal of MP3 and to bulk/substrate terminal Vnwell of MP3. In this case, all devices are protected from EOS. In some embodiments, PUD 204 provides internal bias voltages to protect low voltage devices irrespective of any sequence of power supplies: 1.0V, 1.8V and 3.3V.

Figure 5:
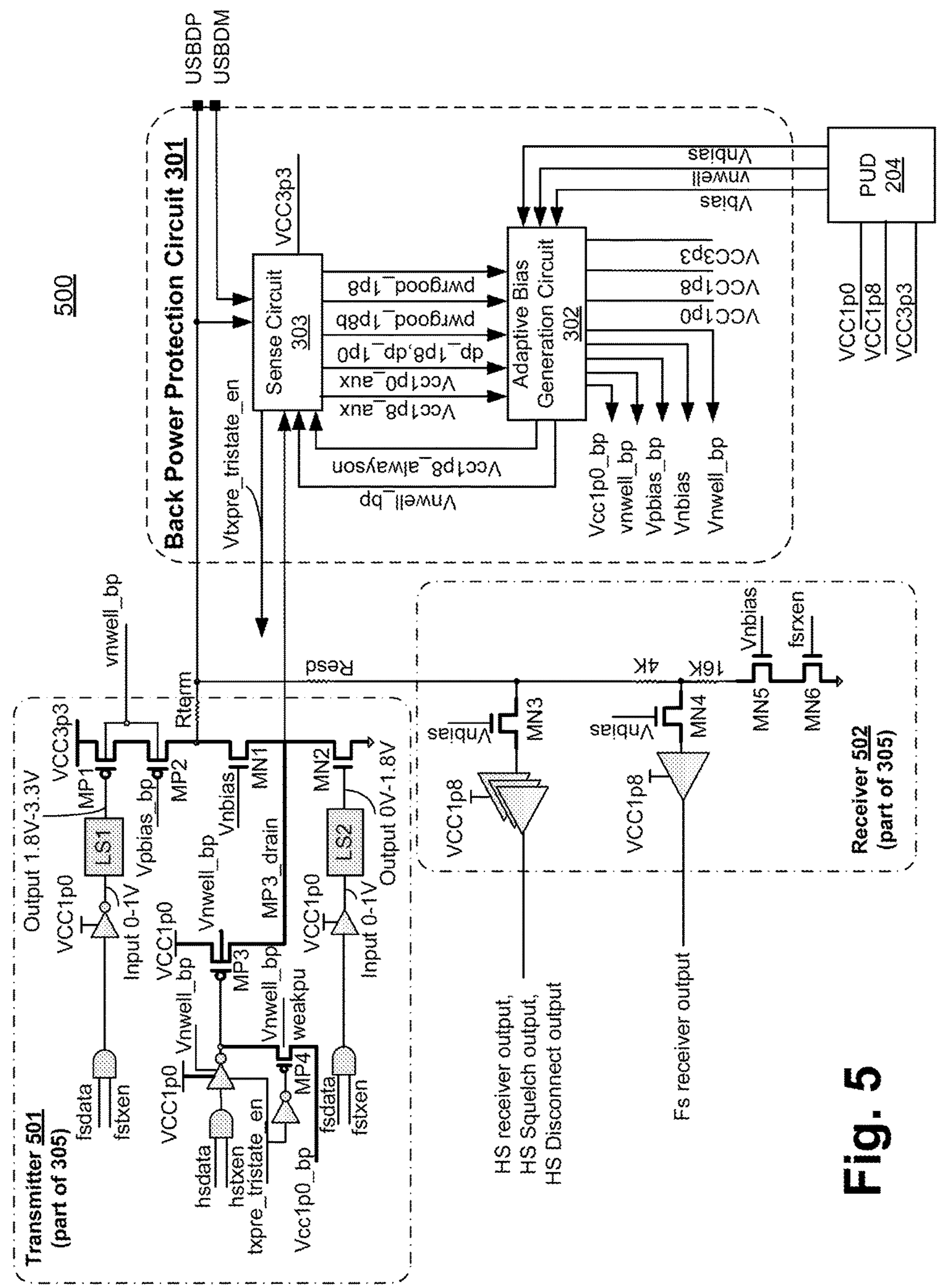
FIG. 5 illustrates a detailed portion of the high level architecture of FIG. 3, according to some embodiments of the disclosure.

FIG. 5 illustrates a detailed portion 500 of the high level architecture of FIG. 3, according to some embodiments of the disclosure. It is pointed out that those elements of FIG. 5 having the same reference numbers (or names) as the elements of any other figure can operate or function in any manner similar to that described, but are not limited to such. Here, half circuit is shown for the USBDP line. A similar circuit is also exists for the USBDM line.

Here, detailed portion 500 is similar to detailed portion 200 for the Transmitter and Receiver parts. The difference between Transmitter 501 and Transmitter 202 is that Transmitter 501 receives different bias voltages for gate and bulk terminals according to presence and absence of power supplies. The difference between Receiver 502 and Receiver 203 is that Receiver 503 receives different bias voltages for gate terminals according to presence and absence of power supplies. So as not to obscure the embodiments, Transmitter 501 and Receiver 502 circuit topologies are not described again in detail.

In some embodiments, Sense Circuit 303 monitors the differential lines USBDP and USBDM and generates control signals for Adaptive Bias Generation Circuit 302. In some embodiments, Sense Circuit 303 also detects high voltage (e.g., 3.3V) power supply off condition by monitoring VCC3p3 supply. In some embodiments, Sense Circuit 303 determines that the VCC3p3 supply is off, and Charging device 109 is coupled to the USBDP and USBDM lines. Sense Circuit 303 then generates internal biases Vcc1p0_aux, Vcc1p8_aux; dp_1p8, dp_1p0; and control power good voltages pwrgood_1p8, pwrgood_1p8b as an indication of supply which is used by Adaptive Bias Generation Circuit 302. Here, dp_1p8 and dp_1p0 are divided down voltages of the voltage on the USBDP line. Likewise, in some embodiments, divided voltages dm_1p8 and dm_p10 are generated from the voltage on the USBDM line. These internally generated voltages are used for generating the biases.

Here, Adaptive Bias Generation Circuit 302 includes Selection logic 304. Outputs Vcc1p0_bp, Vnwell_bp, Vpbias_bp, Vnbias, and Vnwell_bp are one or more of the bias voltages that are output from Selection logic 304. In some embodiments, Adaptive Bias Generation Circuit 302 generates bulk or substrate voltage Vnwell_bp for transistors MP1, MP2, MP3, and MP4 that tracks voltage on the USBDP line. In some embodiments, Adaptive Bias Generation Circuit 302 generates bulk or substrate voltage Vnbias for the receiver control switches which is used for the receiver transistors MN3, MN4, MN5, MN6, and MN1, where Vnbias tracks voltage on the UBSDP line. In some embodiments, similar circuits for the USBDM lines also generate adaptive bias voltages for the USBDM driver and receiver associated circuitry.

In some embodiments, Adaptive Bias Generation Circuit 302 generates gate voltage Vpbias_bg for MP2, where Vpbias_bg follows voltages on the differential lines USBDP and USBDM when VCC3p3=0V, and 1.8V when VCC3p3 is high (e.g., 3.3V). These adaptive bias voltages assist with protecting the transistors from EOS caused by back power current.

In some embodiments, Adaptive Bias Generation Circuit 302 generates Vcc1p0_bp voltage which is used to protect the MP3 device when the voltage on the USBDP line is high. In some embodiments, Adaptive Bias Generation Circuit 302 tracks the voltage on the MP3_drain node when the VCC3p3 supply is off to avoid reverse current flow through MP3. In some embodiments, when VCC3p3 is high (i.e., 3.3V), the gate of MP3 is forced to low voltage (e.g., 1.8V during disable or tri-state mode) by Adaptive Bias Generation Circuit 302. In some embodiments, an ESD circuit is used that is designed such that its ESD diode does not clamp during back power protection.

In some embodiments, when all the power supplies are up (i.e., VCC1p0, VCC1p8, and VCC3p3 are up) then PUD 204 generates Vbias, Vnwell, and Vnbias bias voltages for USB Transceiver AFE 305. In such embodiments, Selection logic 304 (here part of Adaptive Bias Generation Circuit 302) provides Vbias, Vnwell, and Vnbias bias voltages for USB Transceiver AFE 305, where Vnwell is coupled to Vnwell_bp, and Vnbias is coupled to Vnwell_bp.

Figure 6:
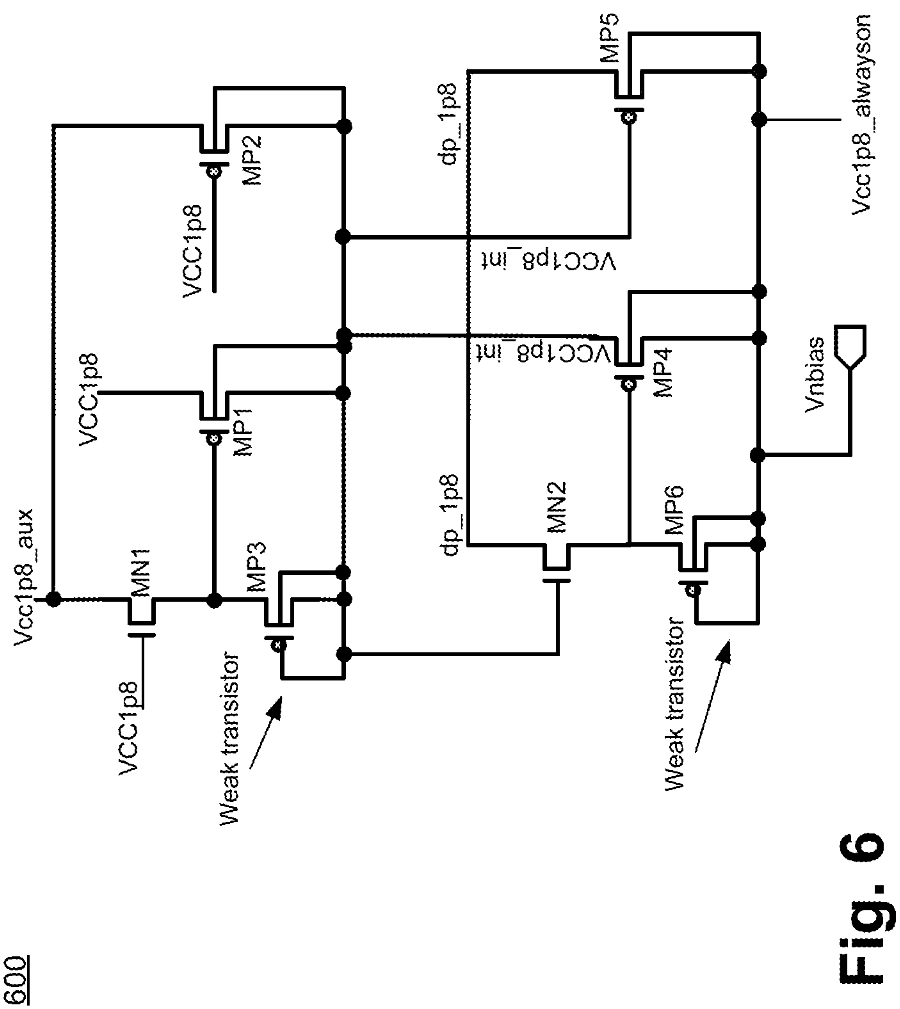
FIG. 6 illustrates an Adaptive Bias Generation Circuit for providing one or more bias voltages when a high power supply (e.g., 3.3V) is absent or when one of a low power supply (e.g., 1.8V) or the high power supply (e.g., 3.3V) is present, according to some embodiments of the disclosure.

FIG. 6 illustrates an Adaptive Bias Generation Circuit 600 (which is part of circuit 302) for providing one or more of the bias voltages when a high power supply (e.g., 3.3V) is absent or when one of a low power supply (e.g., 1.8V) or the high power supply (e.g., 3.3V) is present according to some embodiments of the disclosure. It is pointed out that those elements of FIG. 6 having the same reference numbers (or names) as the elements of any other figure can operate or function in any manner similar to that described, but are not limited to such.

In some embodiments, Adaptive Bias Generation Circuit 600 comprises n-type transistors MN1 and MN2; and p-type transistors MP1, MP2, MP3, MP4, MP5, and MP6 coupled together as shown. In some embodiments, Adaptive Bias Generation Circuit 600 generates bias voltages for transistors MN1 to MN6 of USB Transceiver 305 (i.e., devices in Transmitter 501 and Receiver 502), low voltage (e.g., 1.8V) bulk or substrate voltage Vnbias, and Vcc1p8_alwayson voltage for Sense Circuit 303. Here, Vcc1p8_alwayson is the buffered version of Vnbias (which is not shown), and Vcc1p8_aux is provided by Sense Circuit 303.

In some embodiments, Adaptive Bias Generation Circuit 600 generates dp_1p8 (equivalent to low voltage (e.g., 1.8V) when VCC3p3 is off), and generates low voltage bias (e.g., 1.8V) to protect devices when VCC3p3 or VCC1p8 is present. In some embodiments, VCC1p8_int node is 1.8V if VCC3p3 or VCC1p8 supplies are present. In some embodiments, weak transistors MP3 and MP6 are used to avoid floating bias for MP1 and MP4 transistors when both supplies VCC1p8 and VCC3p3 are present.

In some embodiments, when no supplies are present during back power condition, VCC1p8_int is 0V which enables (or turns on) MP5. In such embodiments, Vnbias and Vcc1p8_alwayson are connected to dp_1p8 node (which is at low voltage (e.g., 1.8V) when voltage on the USBDP line is high (e.g., 3.3V)). In some embodiments, when all supplies are off, transistors MP2, MN2, and MP4 are turned on and provide bias voltage Vnbias which tracks voltage on the USBDP line. In some embodiments, when VCC3p3 is enabled (i.e., high), transistors MN1, MP1, MN2, and MP4 are turned on and provide low voltage (e.g., 1.8V) for Vnbias.

Figures 7A, 7B:
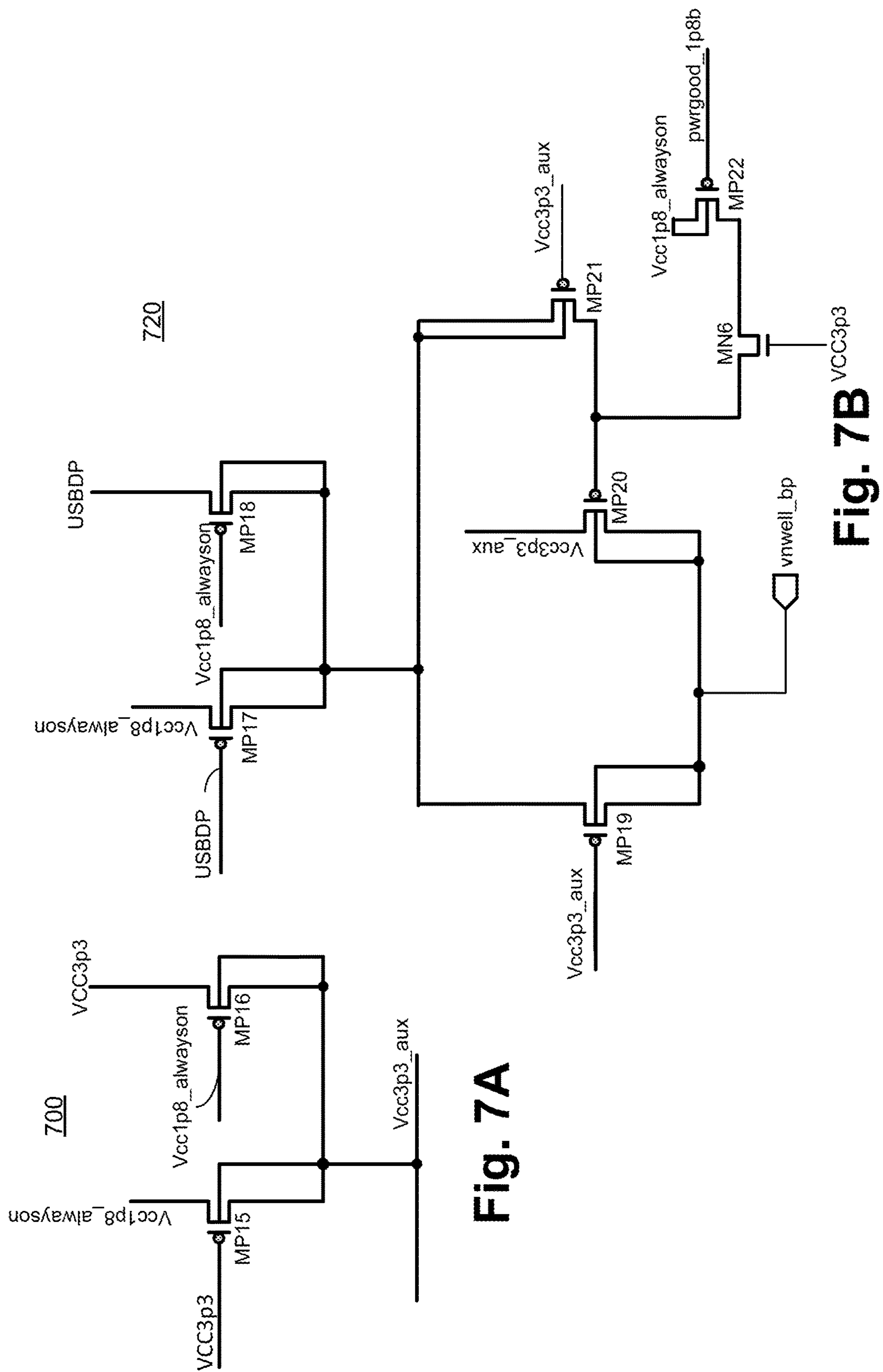
FIG. 7A illustrates a portion of a Sense Circuit for providing a bias voltage for the Adaptive Bias Generation Circuit, according to some embodiments.
FIG. 7B illustrates an Adaptive Bias Generation Circuit for providing one or more bias voltages when a high power supply (e.g., 3.3V) is absent or when the high power supply (e.g., 3.3V) is present, according to some embodiments of the disclosure.

FIG. 7A illustrates a portion 700 of Sense Circuit 303 for providing a bias voltage for Adaptive Bias Generation Circuit 302, according to some embodiments of the disclosure. It is pointed out that those elements of FIG. 7A having the same reference numbers (or names) as the elements of any other figure can operate or function in any manner similar to that described, but are not limited to such.

In some embodiments, portion 700 comprises p-type transistors MP15 and MP16 coupled together as shown. In some embodiments, Vcc3p3_aux is generated from Vcc1p8_alwayson of FIG. 6 and VCC3p3 using MP15 and MP16 devices. In some embodiments, Vcc3p3_aux is VCC3p3 of 3.3V supply when that supply is present.

FIG. 7B illustrates an Adaptive Bias Generation Circuit 720 (which is part of circuit 302) for providing one or more of the bias voltages when a high power supply (e.g., 3.3V) is absent or when the high power supply (e.g., 3.3V) is present, according to some embodiments of the disclosure. It is pointed out that those elements of FIG. 7B having the same reference numbers (or names) as the elements of any other figure can operate or function in any manner similar to that described, but are not limited to such.

In some embodiments, Adaptive Bias Generation Circuit 720 comprises p-type transistors MP17, MP18, MP19, MP20, MP21, and MP22, and n-type transistor MN6 coupled together as shown. In some embodiments, Adaptive Bias Generation Circuit 720 generates bulk or substrate voltages Vnwell_bp for MP1, MP2, MP3, and MP4 of FIG. 5.

Referring back to FIG. 7B, in some embodiments, Adaptive Bias Generation Circuit 720 generates bulk voltage Vnwell_bp which tracks the voltage on the USBDP line when VCC3p3 supply is 0V, and tracks the supply VCC3p3 of 3.3V when the power supply VCC3p3 is present.

Internal auxiliary bias (i.e., Vcc3p3_aux which is, for example, 1.8V when 3.3V supply is off at the Host, and 3.3V when 3.3V supply is present) in low voltage domain (e.g., 1.8V domain) is needed to protect Adaptive Bias Generation Circuit 302 since devices are low voltage tolerant devices (e.g., 1.8V tolerant devices). Transistors MP16, MP18, MP19, and MP21 are biased to low voltage (e.g., 1.8V internal bias voltage) during back power protection condition so that the output of these transistors do not experience higher voltage or voltage beyond device operating limits.

Transistors MP16, MP18, MP19, and MP21 provide the USBDP voltage. In some embodiments, when power supplies (i.e., VCC3p3, VCC1p0, and VCC1p8) are present, transistors MP16, MP20, MP22, and MN6 of Adaptive Bias Generation Circuit 720 are turned on and provide high voltage (e.g., 3.3V) output on Vnwell_bp node. In such embodiments, internal nodes of Adaptive Bias Generation Circuit 720 do not violate EOS limits for low voltage compliant devices (e.g., 1.8V compliant devices). In some embodiments, MN6 and MP22 are used to protect MP20 during the back power condition and provide self-protection for Adaptive Bias Generation Circuit 720.

Figure 8:
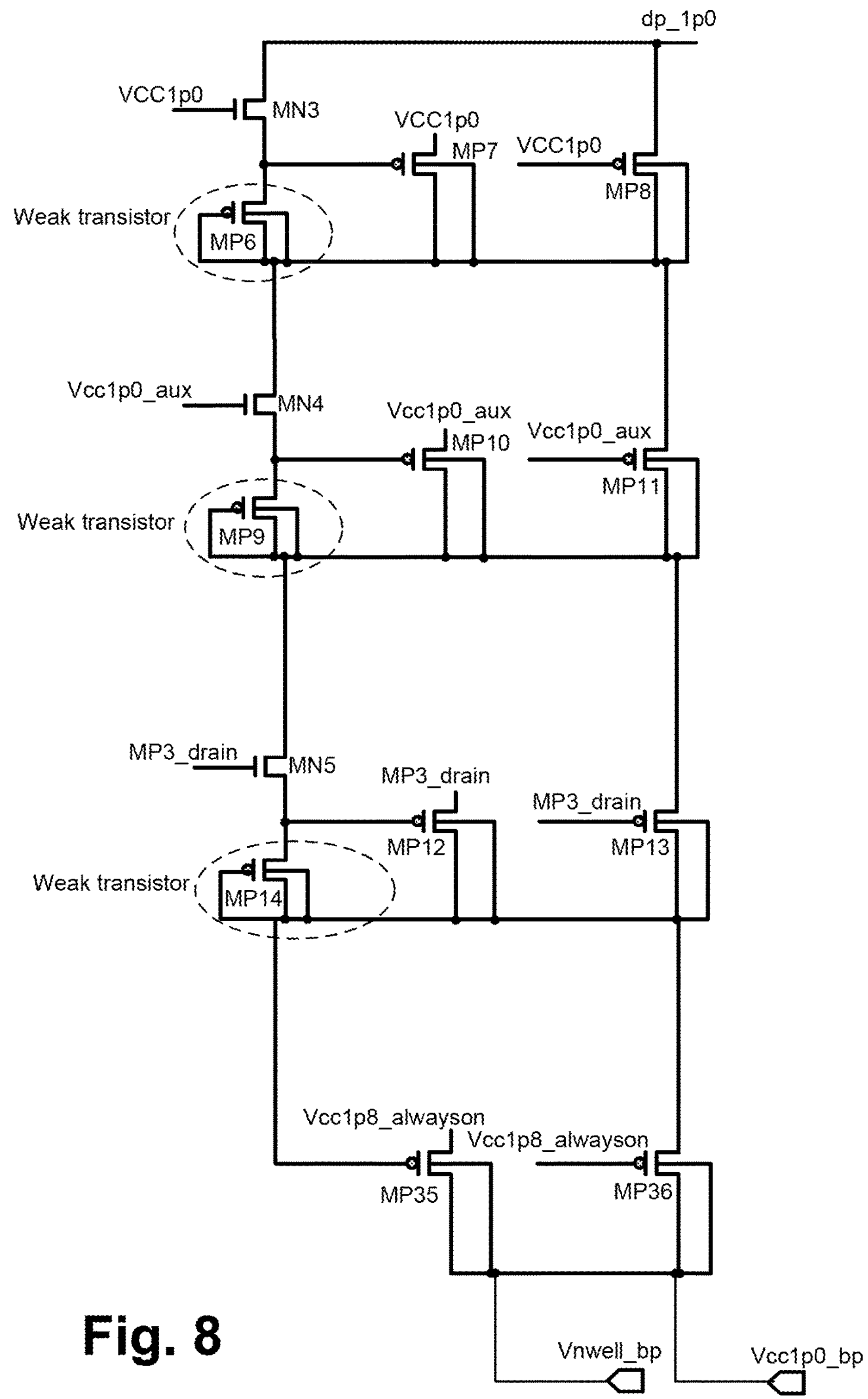
FIG. 8 illustrates an Adaptive Bias Generation Circuit for providing one or more bias voltages for a high-voltage transistor of the multi-voltage signaling transmitter, according to some embodiments of the disclosure.

FIG. 8 illustrates an Adaptive Bias Generation Circuit 800 (which is part of circuit 302) for providing one or more of the bias voltages for a high-voltage transistor of the multi-voltage signaling transmitter, according to some embodiments of the disclosure. It is pointed out that those elements of FIG. 8 having the same reference numbers (or names) as the elements of any other figure can operate or function in any manner similar to that described, but are not limited to such.

In some embodiments, Adaptive Bias Generation Circuit 800 (which is part of circuit 302) comprises n-type transistors MN3, MN4, and MN5; and p-type transistors MP6, MP7, MP8, MP9, MP10, MP11, MP12, MP13, MP14, MP35, and MP36 coupled together as shown. In some embodiments, Adaptive Bias Generation Circuit 800 (part of circuit 302) generates bulk voltage Vnwell_bp for MP3 of FIG. 5 and internal bias voltages. Referring back to FIG. 8, in some embodiments, under the back power condition, MP8, MP11, MN7, MP12, and MP36 are turned on and follow MP3_drain voltage of FIG. 5. Referring back to FIG. 8, in some embodiments, during functional mode when all power supplies are present, MN3, MP7, MN4, MP10, MP13, and MP35 are turned on and provide low voltage (e.g., 1.8V) as the bulk voltage of MP3 device of FIG. 2.

Figure 9:
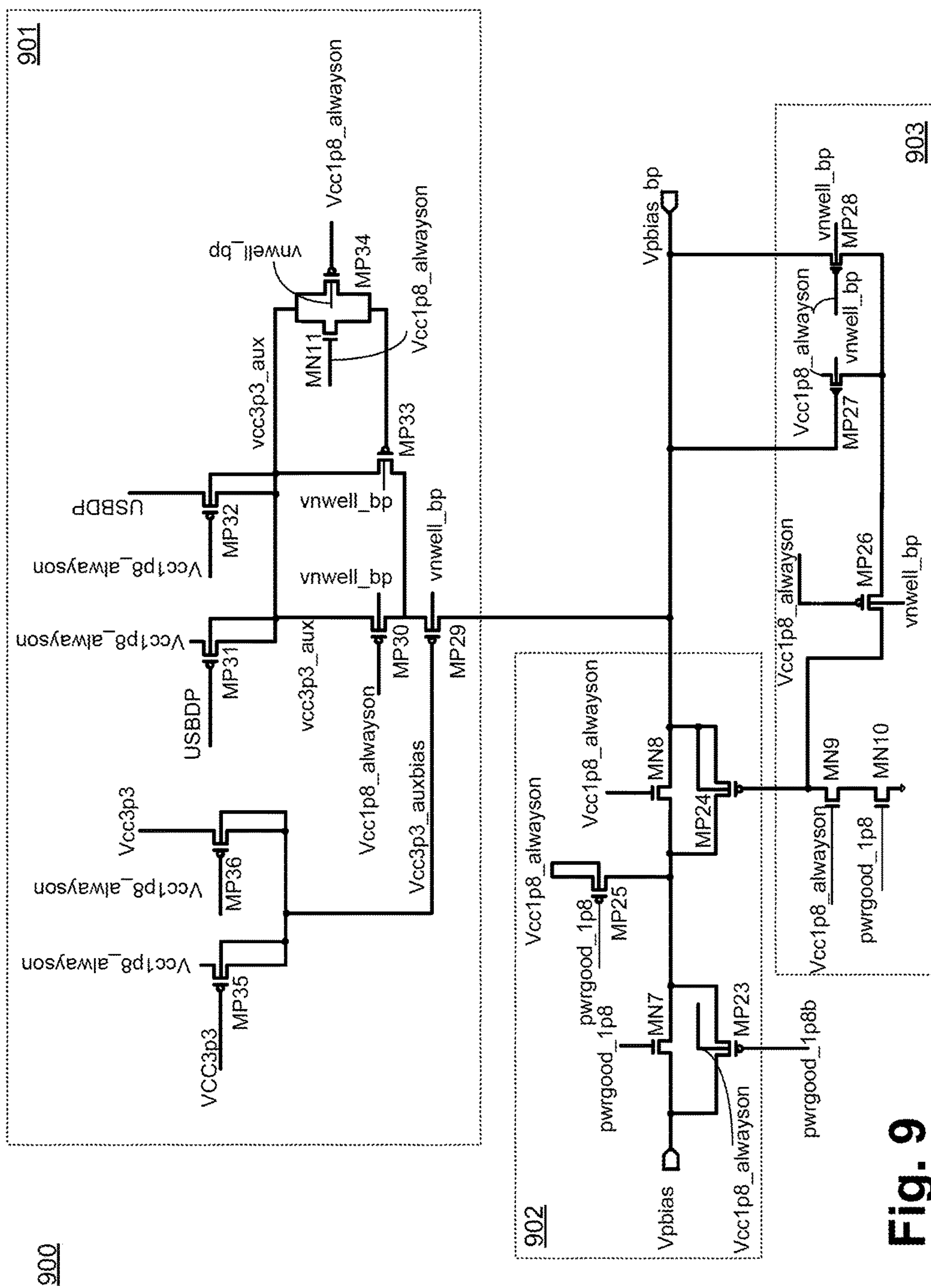
FIG. 9 illustrates an Adaptive Bias Generation Circuit for providing one or more bias voltages for tri-stating the multi-voltage signaling transmitter, according to some embodiments of the disclosure.

FIG. 9 illustrates an Adaptive Bias Generation Circuit 900 (which is part of circuit 302) for providing one or more of the bias voltages for tri-stating the multi-voltage signaling transmitter, according to some embodiments of the disclosure. It is pointed out that those elements of FIG. 9 having the same reference numbers (or names) as the elements of any other figure can operate or function in any manner similar to that described, but are not limited to such.

In some embodiments, circuit blocks 901, 902, and 903 are provided to protect back power current flow through MP2 and MP1 devices of FIG. 5 by tracking their respective gate voltages Vpbias_bp and adaptively following voltage on the USBDP line. Referring back to FIG. 9, in some embodiments, circuit block 901 comprises p-type transistors MP29, MP30, MP31, MP32, MP33, MP34, MP35, and MP36; and n-type transistor MN11 coupled together as shown. In some embodiments, circuit block 901 is used adaptively to track voltage on the USBDP line (or USBDM line) during the time when VCC3p3 is in off condition. In some embodiments, circuit 901 enables biases from PUD 204 as shown in FIG. 3 during functional mode (driver enable).

Referring back to FIG. 9, in some embodiments, circuit block 902 comprises p-type transistors MP23, MP24, and MP25; and n-type transistors MN7 and MN8 coupled together as shown. Circuit block 902 is used to isolate a pre-driver circuitry which drives MP2 transistor as shown in FIG. 5. Referring back to FIG. 9, in some embodiments, circuit block 903 is used to protect MP24 device during back power condition and enables MP24 device during functional case (i.e., when all power supplies are present and the driver is enabled). In some embodiments, circuit block 903 comprises p-type transistors MP26, MP27, and MP28; and n-type transistors MN9 and MN10 coupled together as shown.

Referring back to FIG. 9, during back power condition, in some embodiments, transistors MP32, MP30, MP35, and MP29 DC couple Vpbias_bp to the USBDP line. This DC coupling helps in generating 0V Vgs across the MP2 device of FIG. 5 and also provides high impedance to Transmitter 501 during the back power condition. Referring back to FIG. 9, in some embodiments, transistors MN7, MN8, MP23, and MP24 are turned off and isolate the pre-driver and the Vpbias_bp nodes. In some embodiments, MP25 is used to protect MP23 and MP24 by generating low voltage (e.g., 1.8V) as intermediate voltage.

In some embodiments, transistors MN8, MN9, MN10, MP24, and MP27 of FIG. 9 are turned off which help in isolating the pre-driver (coupled to nodes of a2 and i2) and the Vpbias_bp nodes. Note, the pre-driver for MP2 transistor is not shown. In some embodiments, Vpbias_bp voltage follows the voltage on the UBSDP line which may cause EOS condition for MP24 devices. In such embodiments, transistors MP28 and MP26 allow gate voltage of MP24 to follow Vnbias by which further helps in avoiding reverse path from Vpbias_bp node to the pre-driver.

In some embodiments, when all power supplies are present, transistors MN7, MN8, MP23, MP24, MN9, and MN10 are turned on. In some embodiments, transistors MP25, MP26, MP27, and MP28 are turned off which enable Vpbias voltage to be the same as Vpbias_bp voltage. In some embodiments, MP29 is off and isolates the path from the USBDP line. In some embodiments, MP30, MP33, MP34, MN11, MP32, and MP31 help in avoiding the EOS condition for MP29 device. The EOS condition for MP29 is avoided since the voltage on the gate terminal of MP29 is at high voltage (e.g., 3.3V), voltage on the source terminal of MP29 is at high voltage (e.g., 3.3V), and voltage on the drain terminal of MP29 is at low voltage (e.g., 1.8V) because Vpbias_bp voltage is same as voltage on Vpbias node.

Figures 10A, 10B:
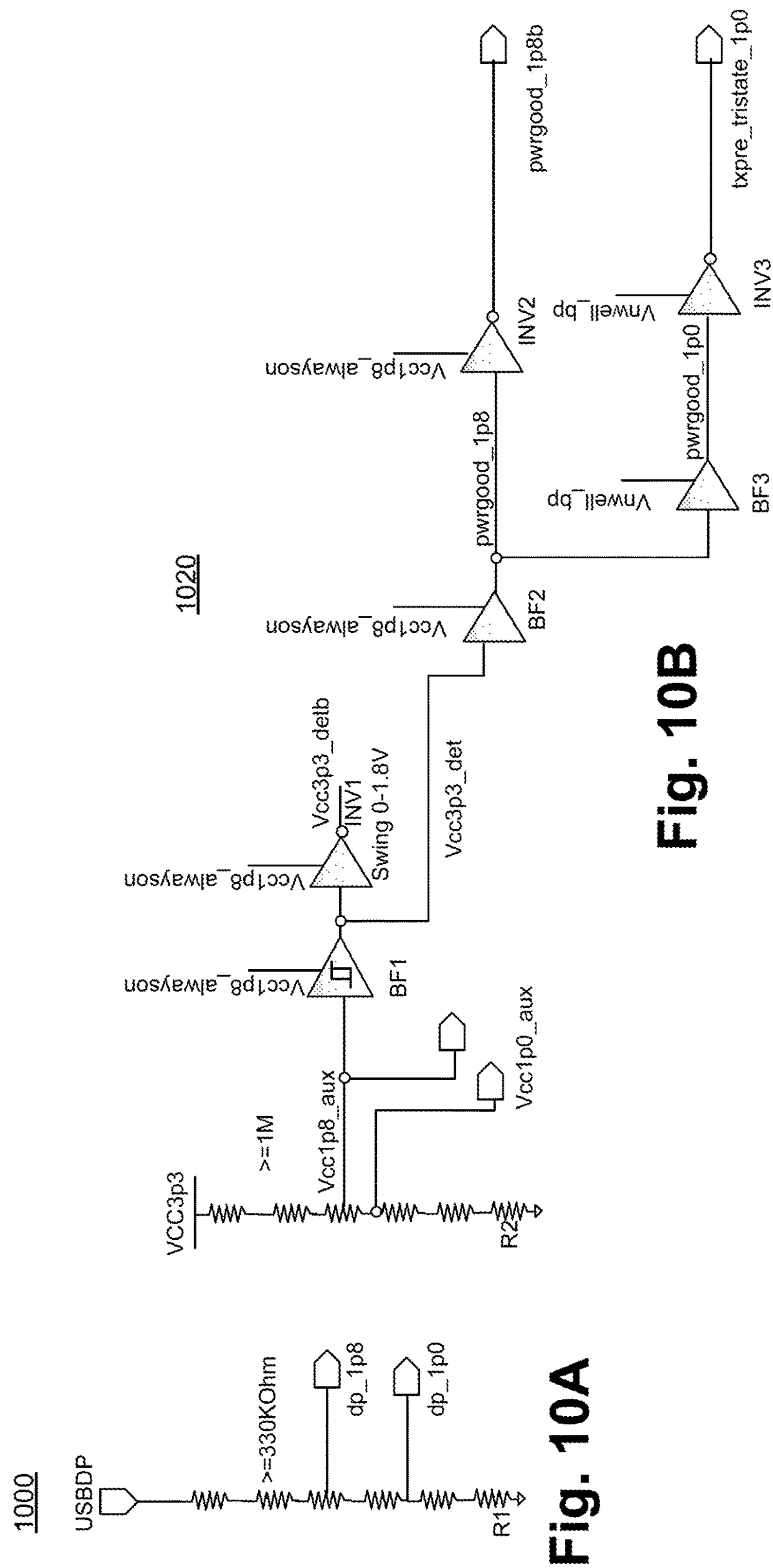
FIGS. 10A-B illustrate a reference generation circuit and a Sense Circuit for the back power protection circuit, according to some embodiments of the disclosure.

FIGS. 10A-B illustrate a reference generation circuit 1000 and a Sense Circuit 1020 (e.g., Sense Circuit 303) for Back Power Protection Circuit 301, according to some embodiments of the disclosure. It is pointed out that those elements of FIGS. 10A-B having the same reference numbers (or names) as the elements of any other figure can operate or function in any manner similar to that described, but are not limited to such.

In some embodiments, reference generation circuit 1000 provides reference voltages dp_1p8 and dp_1p0 using a resistor divider that divides voltage on the USBDP line by resistors R1 (e.g., 330 KOhm each). In some embodiments, the resistor divider is replaced with a capacitive divider. In some embodiments, the resistor divider is replaced with active devices using n-type or p-type transistor. In other embodiments, other types of reference generation circuits may be used. In some embodiments, voltages dp_1p8 and dp_1p0 are used for tracking internal bias voltages when the power supply VCC3p3 is off (or absent).

In some embodiments, Sense Circuit 1020 comprises a reference generator to generate Vcc1p8_aux and Vcc1p0_aux voltages in low voltage domain (e.g., 1.8V domain). In some embodiments, the reference generator comprises a resistor divider that divides VCC3p3 voltage using resistors R2 (e.g., greater or equal to 1 MOhm). In some embodiments, the resistor divider is replaced with a capacitive divider. In some embodiments, the resistor divider is replaced with active devices using n-type or p-type transistor.

In some embodiments, Sense Circuit 1020 further comprises a Schmitt Trigger BF1, buffers BD2 and BF3, inverters INV1, INV2, and INV3 coupled together as shown. In some embodiments, buffered power good signals pwrgood_1p8 and pwrdood_1p0 are generated using supply Vcc1p8_alwayson provided from Adaptive Bias Generation Circuit 600 of FIG. 6 which adaptively follows voltage on the USBDP line when VCC3p3 supply is 0V (i.e., absent).

Figure 11B:
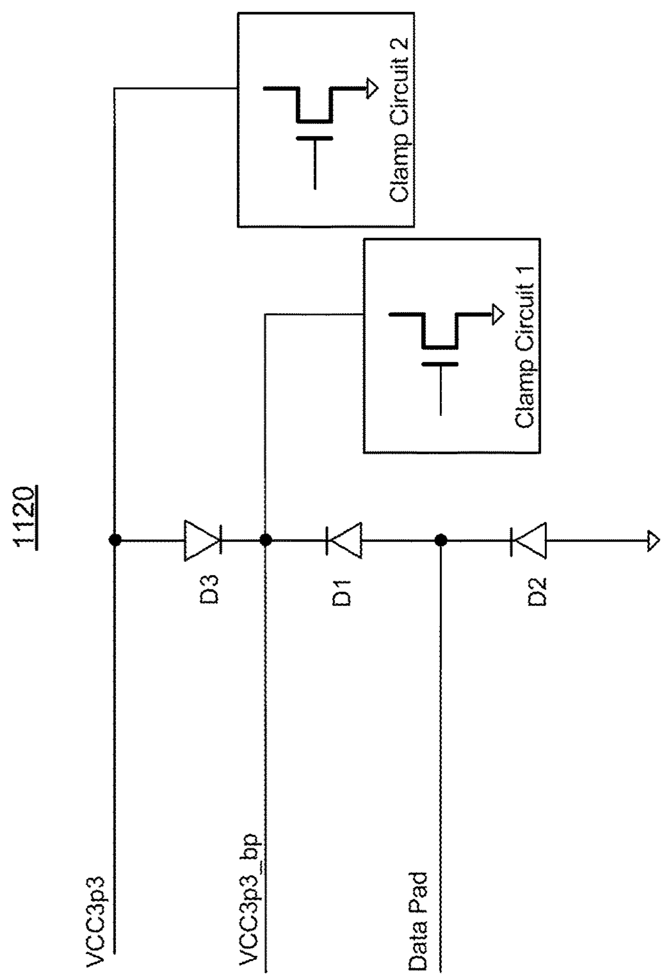
FIG. 11B illustrates an ESD protection circuit for back power protection, according to some embodiments of the disclosure.
Figure 11A:
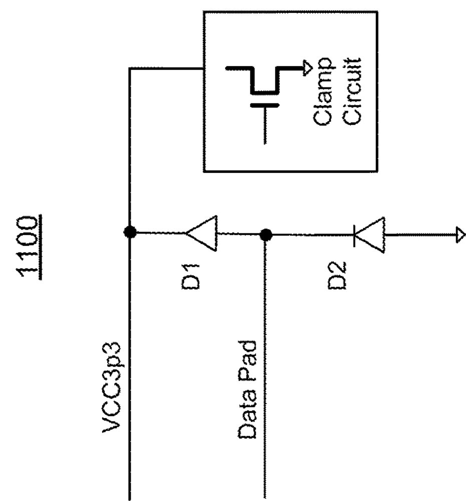
FIG. 11A illustrates a traditional Electro-static Discharge (ESD) protection circuit.

FIG. 11A illustrates a traditional ESD protection circuit 1100. It is pointed out that those elements of FIG. 11A having the same reference numbers (or names) as the elements of any other figure can operate or function in any manner similar to that described, but are not limited to such. ESD protection circuit 1100 consists of diodes D1 and D2 and a clamp circuit coupled together as shown. Here, when VCC3p3 is 0V and the external circuitry (e.g., Charging Device 109) is connected to the USBDP line (i.e., Data Pad), ESD diode D1 clamps the pad voltage to diode cutoff voltage. This clamping restricts the charging detection operation.

FIG. 11B illustrates an ESD protection circuit 1120 for back power protection, according to some embodiments of the disclosure. It is pointed out that those elements of FIG. 11B having the same reference numbers (or names) as the elements of any other figure can operate or function in any manner similar to that described, but are not limited to such.

In some embodiments, ESD protection circuit 1120 comprises three diodes D1, D2, and D3 diodes and clamp circuits (Clamp Circuit 1 and Clamp Circuit 2) coupled together as shown. In these embodiments, D3 diode is used to provide reverse bias condition during the back power condition. In some embodiments, the extra clamp circuit (i.e., Clamp Circuit 2) is used for VCC3p3 and VCC3p3 bp (i.e., auxiliary 3.3V). Unlike the embodiment of FIG. 11A, the embodiment of FIG. 11B does not restrict charging detection operation.

Figure 12:
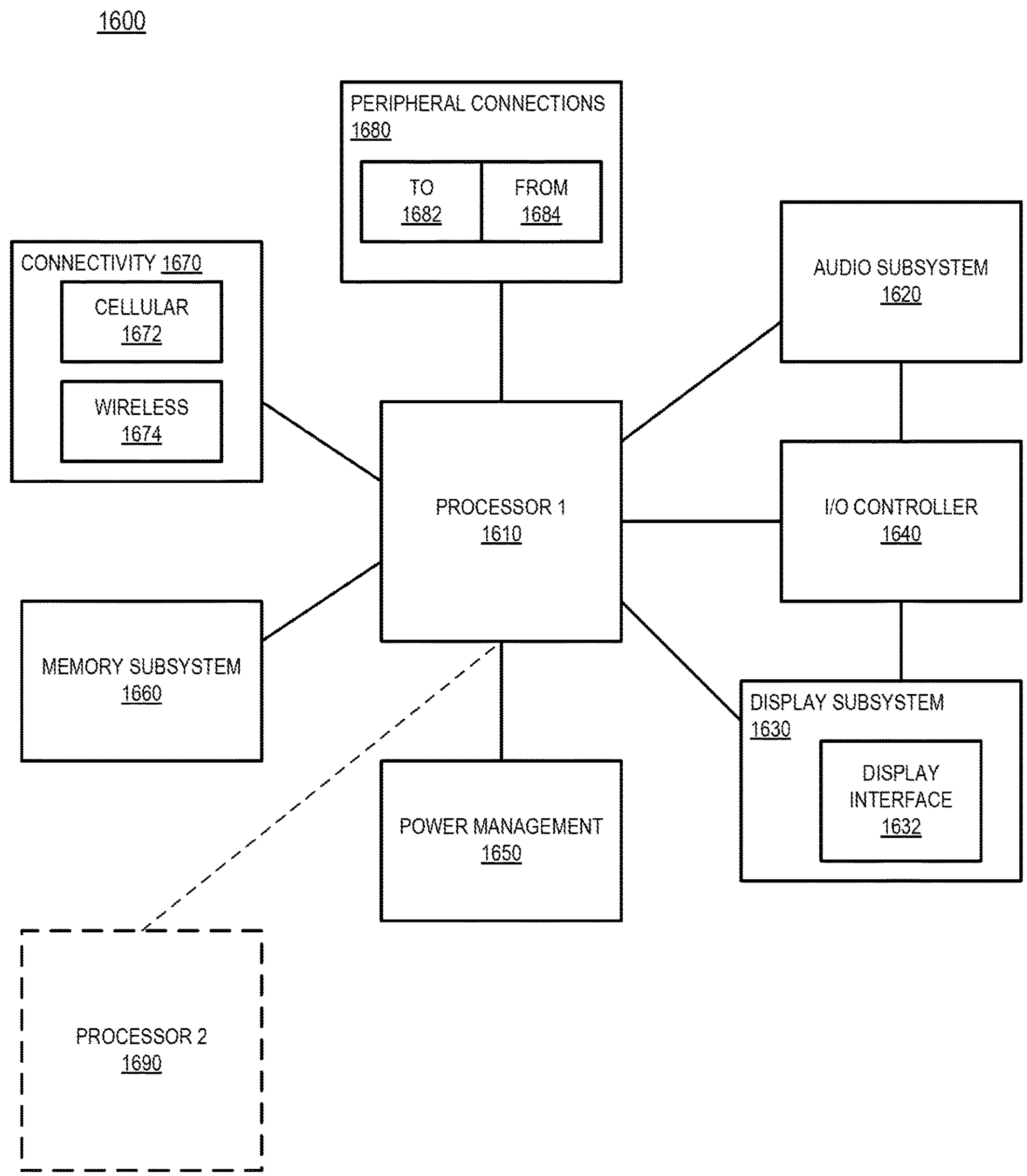
FIG. 12 illustrates a smart device or a computer system or a SoC (System-on-Chip) with the back power protection circuit, according to some embodiments.

FIG. 12 illustrates a smart device or a computer system or a SoC (System-on-Chip) with a back power protection circuit, according to some embodiments of the disclosure. It is pointed out that those elements of FIG. 12 having the same reference numbers (or names) as the elements of any other figure can operate or function in any manner similar to that described, but are not limited to such.

FIG. 12 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with the back power protection circuit, according to some embodiments discussed. Other blocks of the computing device 1600 may also include the back power protection circuit of some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: one or more signal lines; a transceiver coupled to the one or more signal lines; and a bias generation circuit to provide one or more bias voltages for the transceiver to tri-state the transceiver according to signal attributes of the one or more signal lines. In some embodiments, the apparatus comprises a sense circuit to sense the signal attributes of the one or more signal lines. In some embodiments, the apparatus a power-up detector to detect one or more power supplies which are provided to the transceiver.

In some embodiments, the apparatus comprises a circuit which is operable to select, for the transceiver, one or more bias voltages from the power-up detector or the one or more bias voltages from the bias generation circuit according to presence or absence of the one or more power supplies. In some embodiments, the one or more signal lines are coupled to a device external to the apparatus. In some embodiments, the device is a power charger or a device to be charged for power. In some embodiments, the transceiver is one of: a USB compliant transceiver; an HDMI compliant transceiver; or an Interface connected to UICC element (Sim card) in NFC application.

In another example, an apparatus is provided which comprises: a transceiver operable to couple to a charging device external to the apparatus; a power-up detector to detect presence or absence of one or more power supplies to the transceiver; and a back power protection circuit to cause the transceiver to tri-state when the charging device is coupled to the transceiver and the power-up detector detects absence of the one or more power supplies. In some embodiments, the back power protection circuit comprises: a bias generation circuit to provide one or more bias voltages for the transceiver to tri-state the transceiver according to signal attributes of one or more signal lines coupled to the transceiver. In some embodiments, the back power protection circuit comprises: a sense circuit to sense signal attributes of the one or more signal lines. In some embodiments, the back power protection circuit comprises: a circuit which is operable to select, for the transceiver, one or more bias voltages from the power-up detector or the one or more bias voltages from the bias generation circuit according to presence or absence of the one or more power supplies. In some embodiments, the transceiver is one of: a USB compliant transceiver; an HDMI compliant transceiver; or an Interface connected to UICC element (Sim card) in NFC application.

In another example, a system is provided which comprises: a memory; a processor coupled to the memory, the processor including: a transceiver operable to couple to a charging device external to the apparatus; a power-up detector to detect presence or absence of one or more power supplies to the transceiver; and a back power protection circuit to cause the transceiver to tri-state when the charging device is coupled to the transceiver and the power-up detector detects absence of the one or more power supplies; and a wireless interface for allowing the processor to communicate with another device. In some embodiments, the system comprises: a display interface for allowing a display unit to display content processed by the processor. In some embodiments, the back power protection circuit comprises: a bias generation circuit to provide one or more bias voltages for the transceiver to tri-state the transceiver according to signal attributes of one or more signal lines coupled to the transceiver.

In some embodiments, the back power protection circuit comprises: a sense circuit to sense signal attributes of the one or more signal lines. In some embodiments, the back power protection circuit comprises: a circuit which is operable to select, for the transceiver, one or more bias voltages from the power-up detector or the one or more bias voltages from the bias generation circuit according to presence or absence of the one or more power supplies.

In some embodiments, the back power protection circuit comprises: a circuit which is operable to select for the transceiver one or more bias voltages from the power-up detector or the one or more bias voltages from the bias generation circuit to protect internal devices and the bias generation circuit. In some embodiments, the transceiver is one of: a USB compliant transceiver; an HDMI compliant transceiver; an Interface connected to UICC element (Sim card) in NFC application. In some embodiments, the charging device is one of: a USB compliant charging device; an HDMI compliant charging device; or an Interface connected to UICC element (Sim card) in NFC application.

In another example, an apparatus is provided which comprises: means for providing one or more signal lines; and means for providing one or more bias voltages for a transceiver to tri-state the transceiver according to signal attributes of the one or more signal lines. In some embodiments, the apparatus comprises means for sensing the signal attributes of the one or more signal lines. In some embodiments, the apparatus comprises means for detecting one or more power supplies which are provided to the transceiver.

In some embodiments, the apparatus comprises means for selecting, for the transceiver, one or more bias voltages according to presence or absence of the one or more power supplies. In some embodiments, the one or more signal lines are coupled to a device external to the apparatus. In some embodiments, the device is a power charger or a device to be charged for power. In some embodiments, the transceiver is one of: a USB compliant transceiver; an HDMI compliant transceiver; or an Interface connected to UICC element (Sim card) in NFC application.

In another example, a method is provided which comprises: providing one or more signal lines; and providing one or more bias voltages for a transceiver to tri-state the transceiver according to signal attributes of the one or more signal lines. In some embodiments, the method comprises sensing the signal attributes of the one or more signal lines. In some embodiments, the method comprises detecting one or more power supplies which are provided to the transceiver. In some embodiments, the method comprises selecting, for the transceiver, one or more bias voltages according to presence or absence of the one or more power supplies. In some embodiments, the one or more signal lines are coupled to a device external to the apparatus. In some embodiments, the device is a power charger or a device to be charged for power. In some embodiments, the transceiver is one of: a USB compliant transceiver; an HDMI compliant transceiver; or an Interface connected to UICC element (Sim card) in NFC application.

In another example, a system is provided which comprises: a memory; a processor coupled to the memory, the processor including: means for providing one or more signal lines; and means for providing one or more bias voltages for a transceiver to tri-state the transceiver according to signal attributes of the one or more signal lines; and a wireless interface for allowing the processor to communicate with another device. In some embodiment, the system comprises a display interface for allowing a display unit to display content processed by the processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:

a transceiver to couple to a device external to the apparatus;

a power-up detector to receive an internal power supply; and a protection circuit, wherein the protection circuit is to bias the transceiver using power from the internal power supply via the power-up detector, in response to the internal power supply being available, wherein the transceiver comprises a transmitter, and wherein the transmitter comprises:

a first p-type transistor; and a second p-type transistor coupled in series with the first p-type transistor.

2. The apparatus of claim 1, wherein the protection circuit is to cause the transceiver to be in a high impedance state using power from the device external to the apparatus, in response to the internal power supply being unavailable to bias the transceiver.

3. The apparatus of claim 2, wherein the protection circuit is to cause the transceiver to be in the high impedance state by tri-stating the transceiver.

4. The apparatus of claim 1, wherein the protection circuit comprises:

a sense circuit to sense availability of the internal power supply.

5. The apparatus of claim 2, wherein the power from the device is received in the apparatus via a first signal line and a second signal line, and wherein the protection circuit comprises:

a sense circuit to sense attributes of signals transmitted over the first signal line and the second signal line.

6. The apparatus of claim 5, wherein the sense circuit is to sense an availability of the power from the device external to the apparatus.

7. The apparatus of claim 2, wherein:

the protection circuit is to select one of the power from the internal power supply to bias the transceiver or the power from the device external to the apparatus to cause the transceiver to be in the high impedance state, based at least in part on:

availability of the internal power supply, and availability of power from the device external to the apparatus.

8. The apparatus of claim 2, wherein:

the protection circuit is to bias one or more transistors within the protection circuit using power from the device external to the apparatus, in response to the internal power supply being unavailable.

9. The apparatus of claim 2, further comprising:

a battery, wherein the internal power supply is unavailable in response to a charge level of the battery being exhausted or in response to the battery being turned off.

10. The apparatus of claim 1, wherein the transceiver is one of:

a USB compliant transceiver;

an HDMI compliant transceiver; or an Interface connected to UICC element (Sim card) in NFC application.

11. The apparatus of claim 2, wherein the protection circuit comprises:

a bias generation circuit to:

selectively receive the internal power supply and/or the power from the device external to the apparatus, and generate bias voltage for the transceiver from one of the internal power supply or the power from the device external to the apparatus.

12. The apparatus of claim 2, wherein the transmitter is to provide a first voltage signaling and a second voltage signaling to the device external to the apparatus.

13. The apparatus of claim 12, wherein the transmitter comprises:

a first n-type transistor coupled in series with the second p-type transistor;

a second n-type transistor coupled in series with the first n-type transistor; and a third p-type transistor coupled to the first and second n-type transistors.

14. The apparatus of claim 13, wherein the protection circuit is to supply bias voltages to at least two of the first p-type, second p-type, third p-type, first n-type, and second n-type transistors.

15. A system comprising:

a memory;

a processor coupled to the memory, the processor including:

a transceiver to couple to a charging device external to the system; and a back power protection circuit to cause the transceiver to tri-state based on the charging device being coupled to the transceiver and one or more internal power supply of the system is inadequate or unavailable to bias the transceiver, wherein the transceiver comprises a transmitter, and wherein the transmitter comprises:

a first p-type transistor; and a second p-type transistor coupled in series with the first p-type transistor; and a wireless interface to facilitate the processor to communicate with another device.

16. The system of claim 15, further comprising:

a display interface to display content processed by the processor.

17. The system of claim 15, wherein the back power protection circuit is to bias the transceiver with power from the one or more internal power supply, based on the one or more internal power supply of the system being adequate to bias the transceiver.

18. An apparatus comprising:

means for receiving one or both of an internal power supply and external power supply from a device that is external from the apparatus;

means for communicating, by a transceiver of the apparatus, with the device;

means for biasing the transceiver using power from the internal power supply, in response to the internal power supply being available; and means for causing the transceiver to be in a high impedance state using power from the device external to the apparatus, in response to the internal power supply being unavailable to bias the transceiver and in response to the device being coupled to the apparatus, wherein the transceiver comprises a transmitter, and wherein the transmitter comprises:

a first p-type transistor; and a second p-type transistor coupled in series with the first p-type transistor.

19. The apparatus of claim 18, further comprising:

means for sensing an availability of the internal power supply; and means for sensing an availability of the power from the device external to the apparatus.

20. The apparatus of claim 18, wherein:

the internal power supply is unavailable in response to a charge level of a battery being exhausted or in response to the battery being turned off.

21. An apparatus comprising:

a Universal Serial Bus (USB) compliant transceiver to couple to a device external to the apparatus;

a first circuit to detect presence or absence of one or more power supply voltages on one or more power supply rails, wherein the one or more power supply rails are coupled to the transceiver; and a second circuit to change output characteristic of the transceiver based on the device being coupled to the transceiver and based on the detection by the first circuit of absence of the one or more power supply voltages.

22. The apparatus of claim 21, wherein the second circuit comprises: a bias generation circuit to provide one or more bias voltages for the transceiver to tri-state the transceiver according to signal attributes of one or more signal lines coupled to the transceiver.

23. The apparatus of claim 22, wherein the second circuit is to sense signal attributes of the one or more signals.

24. The apparatus of claim 21, wherein the device external to the apparatus comprises a battery.

25. The apparatus of claim 21, wherein:

the transceiver comprises a transmitter which comprises:

a first p-type transistor;

a second p-type transistor coupled in series with the first p-type transistor;

a first n-type transistor coupled in series with the second p-type transistor;

a second n-type transistor coupled in series with the first n-type transistor; and a third p-type transistor coupled to the first and second n-type transistors; and the second circuit is to supply bias voltages to at least two of the first p-type, second p-type, third p-type, first n-type, and second n-type transistors.

* * * * *